United States Patent [19]

Ivancevic

[11] Patent Number: 4,856,900
[45] Date of Patent: Aug. 15, 1989

[54] QUADRUPOLE-WOUND FIBER OPTIC SENSING COIL AND METHOD OF MANUFACTURE THEREOF

[75] Inventor: Mirko Ivancevic, North Hollywood, Calif.

[73] Assignee: Litton Systems, Inc., Beverly Hills, Calif.

[21] Appl. No.: 57,626

[22] Filed: Jun. 3, 1987

[51] Int. Cl.⁴ .............................................. G01B 9/02
[52] U.S. Cl. ................................................... 356/350
[58] Field of Search ................ 356/350; 242/159, 166, 242/174

[56] References Cited

FOREIGN PATENT DOCUMENTS 3533687  3/1987  Fed. Rep. of Germany ...... 356/350

OTHER PUBLICATIONS

N. J. Frigo "Compensation of Linear Sources of Non-reciprocity in Signal Interferometers", *SPIE Proceedings, Fiber Optic and Laser Sensors*, vol. 412 (Arlington, Va., Apr. 5 through 7, 1983) at pp. 268-271.

*Primary Examiner*—Davis L. Willis
*Assistant Examiner*—S. A. Turner
*Attorney, Agent, or Firm*—Elliott N. Kramsky

[57] ABSTRACT

A quadrupole-wound sensing coil for a fiber optic gyroscope and a method for forming such a coil. Layer pairs wound from two supply reels terminate with three concentric turns adjacent distinct home flanges. The concentric turns form borders at the ends of the wound layers and bridges to new layers to be formed so that fiber pinching and undesirable microbends are avoided while packing density is enhanced.

4 Claims, 3 Drawing Sheets

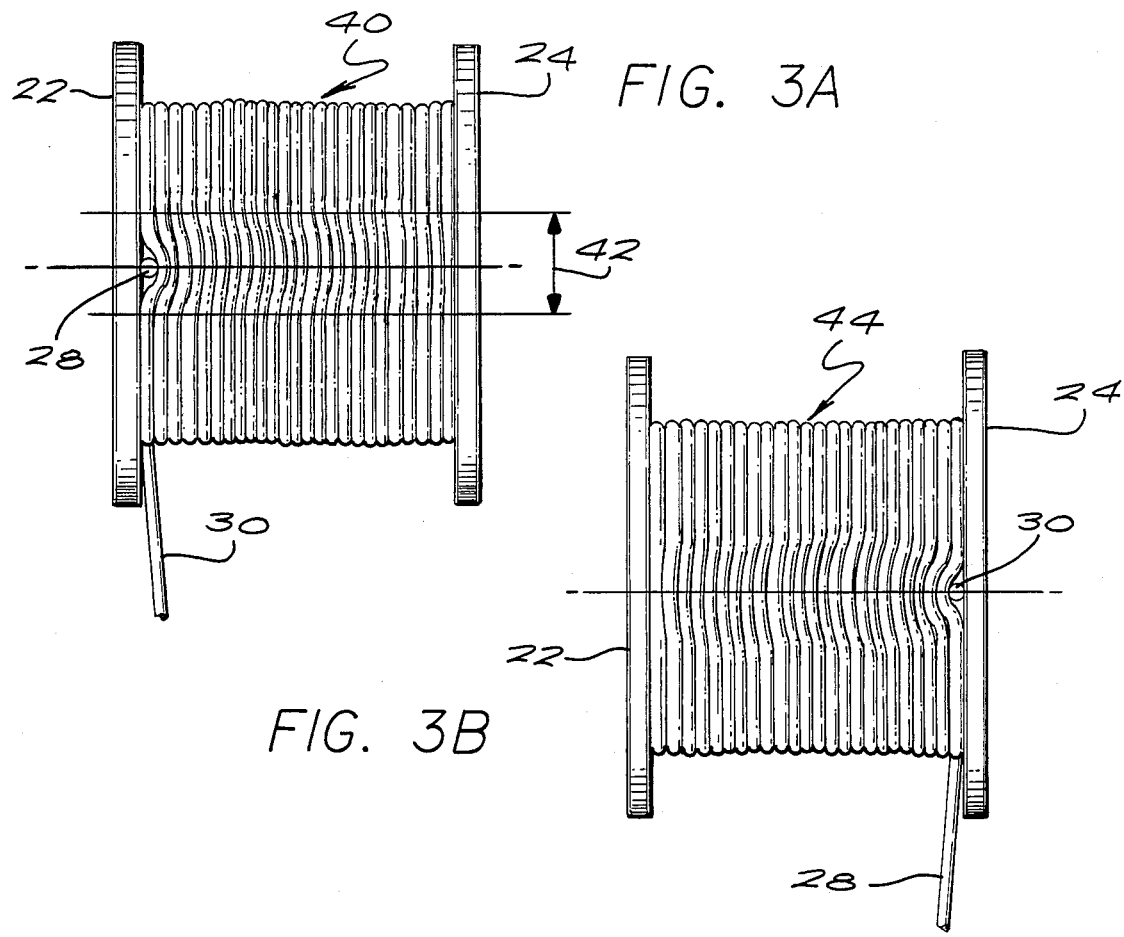
FIG. 3A
FIG. 3B
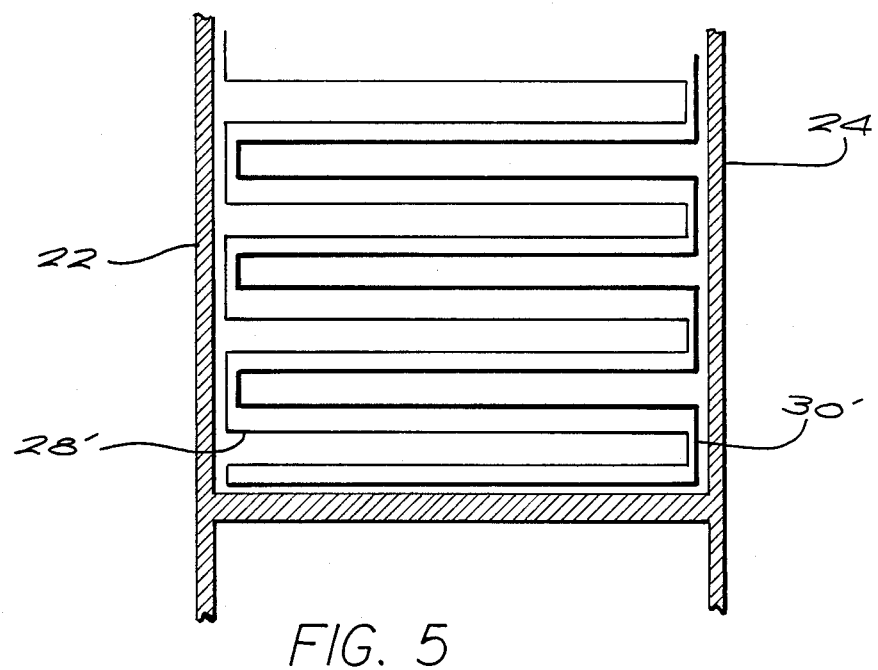
FIG. 5

QUADRUPOLE-WOUND FIBER OPTIC SENSING COIL AND METHOD OF MANUFACTURE THEREOF

BACKGROUND

1. Field of the Invention

This invention relates to sensing coils for fiber optic gyroscopes and to methods of manufacture thereof. More particularly, this invention pertains to improved quadrupole-wound fiber optic sensing coils and methods for their formation.

2. Description of the Prior Art

Fiber optic gyroscopes comprise two main components, (1) an interferometer (including a light source, beamsplitter, and detector) and (2) a fiber optic sensing coil. Light from the interferometer light source is split by the beamsplitter and applied to the ends of the sensing coil. The interferometer and associated electronics process the phase relationship between the two interfering, counter-propagating beams of light that emerge from (opposite ends of) the coil. The difference between the phase shifts experienced by the two beams provides a measure of the rate of rotation of the platform to which the instrument is fixed.

It has been found that the effective operation of a fiber optic gyropscope requires a sensing coil of quadrupole-wound symmetry. This symmetry is attained by splitting the continuous fiber length into two source spools having equal lengths of fiber, and winding onto a reel, alternating source spools for each consecutive dual layer. A dual layer consists of two layers with their wrap starting and stopping at the same flange. The first layer is wound singly and forms the inner layer of the coil. Thereafter, layers are wound in alternating pairs from the two supply reels. Such an arrangement is shown in FIG. 1. As is seen, an optical fiber 10 is wound onto a take-up spool 12 from supply spools 14 and 16. The fiber 10 is wound from a single supply spool at a time and the other supply spool is rotated with the take-up or sensor spool to prevent the unwinding of previously formed layers. Thus, in FIG. 1, a layer of fiber 10 is wound onto the sensor spool 12 from the supply spool 14. The supply spool 16 is mounted for rotation with the take-up spool 12 by a common shaft 18. The supply spools 14 and 16 are alternately mounted to the shaft 18 to rotate with the sensor (take-up) spool 12 as the fiber 10 is fed onto the sensor spool 12 from the remaining supply or auxiliary spool.

The quadrupole winding pattern preserves symmetry about the center of the fiber and, as a result, decreases those phase errors that are otherwise induced by changing thermal conditions. The influence of changing thermal gradients upon phase errors, known as the Shupe Effect, is discussed, for example by N. J. Frigo in "Compensation of Linear Sources of Non-reciprocity in Signal Interferometers", *SPIE Proceedings, Fiber Optic and Laser Sensors*, Volume 412 (Arlington VA, Apr. 5 through 7, 1983) at pages 268-271.

The currently-recognized method for forming a sensor coil of quadrupole symmetry is illustrated by the set of drawing FIGS. 2A through 2C. In these figures, and the other figures of the application generally, the thickness of the fiber 10 is highly exaggerated to facilitate an understanding of the invention. A representative fiber optic sensor coil in accordance with the invention might comprise one thousand (1000) meters of 0.008 inch diameter fiber wound in ninety-two (92) layers onto a take-up spool having a one-half inch wide central core.

The conventional quadrupole winding process is begun by positioning the midpoint of the fiber 10 onto the central core 20 of the sensor spool 12 adjacent one of its opposed flanges 22 and 24.

Winding from the first of the supply spools along the direction 26, a first layer is formed atop the core 20 as shown in FIG. 2A. (Each cross-section of the fiber 10 indicates a turn of the coil winding. Turns wound from the two supply spools are distinguished by the presence -and absence- of interior stippling.)

After the initial layer is wound onto the sensor spool 12, the two supply spool leads 28, 30 are then positioned adjacent the flanges 22 and 24 as shown. The formation of this initial layer is considered part of the initial setup and is not performed again.

The relative positions of the supply spools (according to the arrangement of FIG. 1) are then rotated so that the layer formed in FIG. 2A is maintained and a second layer formed from the second supply spool by winding away from the "home" (left) flange 22 of the second supply to the flange 24 as illustrated in FIG. 2B. (The lead 30, at the same time, "pops up" as shown.) This is followed by a reversal in the direction of winding of the fiber 10 from the second supply spool to create a third (stippled) layer as shown in FIG. 2C.

The lead 30, as shown in FIGS. 2B and 2C, is upwardly directed to avoid "burial" under the stippled layers of the other supply and to permit the formation of a pair of (non-stippled) layers thereover from the first supply. The first of such layers, indicated at 32, is formed by winding from lead 30 in the direction 34 and the second, overlying layer 36 is formed by winding in the reverse direction 38. As noted, the lead 28 projects upwardly at the edges of these layers adjacent the flange 22 to permit the formation of a pair of layers from the second supply. The foregoing steps for forming pairs of layers are repeated, the supplies alternating every two layers as indicated by the contrasting turn markings of FIG. 2C, and the process continued until all of the fiber 10 is wound from the supply spools to the take-up or sensor spool 12.

The resulting coil has the property that lengths of fiber 10 that are equidistant from the center of the spool 12 are in close proximity and therefore of substantially identical temperature. As a consequence, temperature gradients are relatively symmetrical about the center of the wound coil. It follows from this that phase errors due to the Shupe Effect are likewise symmetrical about the center of the fiber and may, therefore, be cancelled.

A problem with the above-described technique for forming a quadrupole sensing coil resides in the fact that the indicated pop-up portions of the leads 28 and 30 are utilized to connect pairs of layers wound from the supply spools 16 and 14. When a supply spool is wound to its home flange, the other supply spool, from which the fiber is being wound, "pins" the lead to the flange, causing stresses (i.e. microbends) in the pinned lead and in the wrapped layers adjacent the pinned lead. Further, each lead pop-up causes distortions near the flange. Over several layers, such irregularities sum to distort the coil badly. In actual cases, the flat front of each layer can become so distorted that it is impossible to identify the layer and the winding pattern is lost. Due to the introduction of microbends, even coils that are successfully wound without losing their pattern can experience severely degraded optical performance. Further, such distortion of the winding pattern reduces the packing density of the coil which, in turn, can degrade and effectively limit the accuracy of the fiber optic gyroscope.

An important coil parameter that is significantly effected by microbends is the extinction ratio that characterizes the degree of isolation between the polarization modes of light transmitted through the wound cavity of a high precision fiber optic gyro. This parameter measures the ratio (in powers of dB) of the two polarization modes at the fiber exit port when all power is launched with one polarization at the entrance port. Optical fiber for forming a gyro is commonly provided in 1100 meter lengths characterized by a measured extinction ratio that exceeds 20 dB. It has been found that, when such fiber is wound or formed into a quadrupole configuration in accordance with the above-described conventional prior art method, the measured extinction ratio is degraded to less than 9 dB. This order-of-magnitude decrease in optical isolation represents a loss of signal energy and a diminution of instrument accuracy that is unacceptable for high performance gyros.

SUMMARY OF THE INVENTION

The present invention overcomes the foregoing and other shortcomings of the prior art by providing, in a first aspect, a novel method for winding a fiber in a quadrupole configuration onto a take-up spool comprising a central core and opposed flanges from first and second supplies. The method of the invention is begun by locating a point of the fiber intermediate the supplies. This point is then positioned adjacent the inside surface of the first flange of the sensor spool.

A layer of the fiber from the first supply is wound in a first direction along the width of the core. Thereafter, a first supply lead is formed by winding three concentric turns continuous with and about the end turn of that layer adjacent the second flange of the spool. A layer of fiber from the second supply is then wound in the first direction along the width of the central core to the first supply lead and then a layer of the fiber from the second supply is wound in a second, opposite direction along the width of the core. Thereafter, a second supply lead is formed by winding three concentric turns continuous with and about the end turn of the last-named layer adjacent the first flange of the spool.

A pair of layers from the first supply is then wound continuous with the first supply lead substantially in accordance with the preceding steps so that the second layer of the pair of layers from the second supply terminates in three turns concentric with the last turn of the layer thereby forming a first supply lead adjacent the second flange of the spool. Pairs of layers are then wound alternatively from the first and second supplies in accordance with the preceding procedure whereby the concentric turns form first and second supply leads that bridge layer pairs wound from such supplies.

In a second aspect, the invention provides an improved quadrupole-wound fiber optic coil that is wound from a pair of supplies. The coil includes a plurality of wound layers, each of which comprises a plurality of adjacent coaxial turns. The plurality of layers includes a single, inner layer and a plurality of layers formed in alternating piars from the two supplies. The inner layer and each of the layer pairs terminates in three concentric turns about the layer's end turn forming leads to the next layer pair wound from the associated supply.

The foregoing and additional features and advantages of this invention will become apparent from the detailed description that follows. The written portion of the description is accompanied by a set of drawing figures. Numerals indicate the various features of the invention in both the written description and the drawing figures. Like numerals refer to like features throughout both the written description and the drawings.

BRIEF DESCRIPTION OF THE DRAWINGS

FIGS. 3A and 3B are views of layers of a quadrupole-wound fiber optic coil formed in accordance with the prior art technique of FIGS. 2A through 2D;

FIG. 5 is a schematic view of the layer arrangement of a fiber optic coil formed in accordance with the invention.

DETAILED DESCRIPTION

Figure 2A:
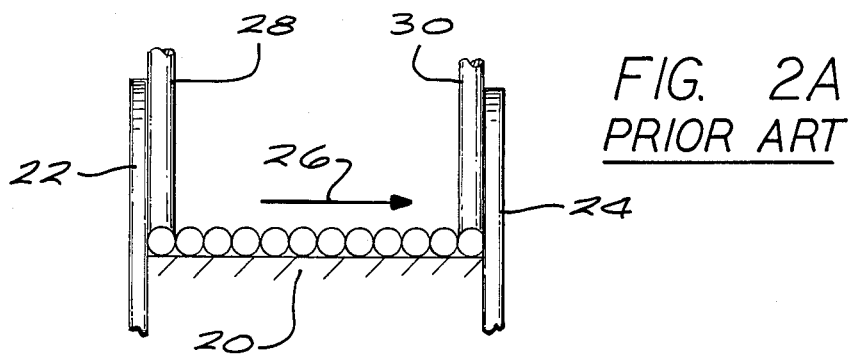
FIGS. 2A through 2C illustrate the formation of a quadrupole-wound sensing coil onto a sensor spool in accordance with the prior art.
Figure 2B:
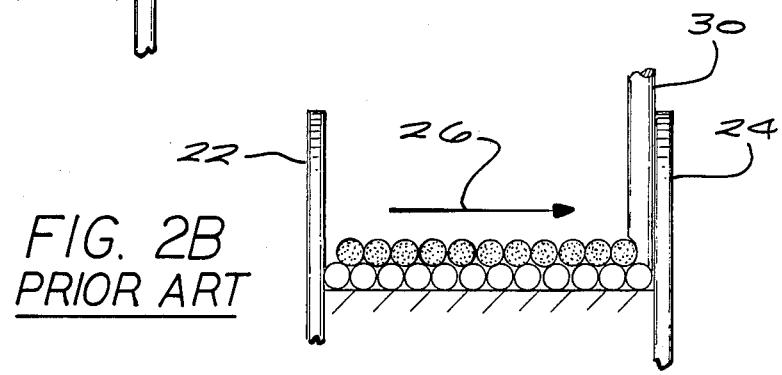
Figure 2C:
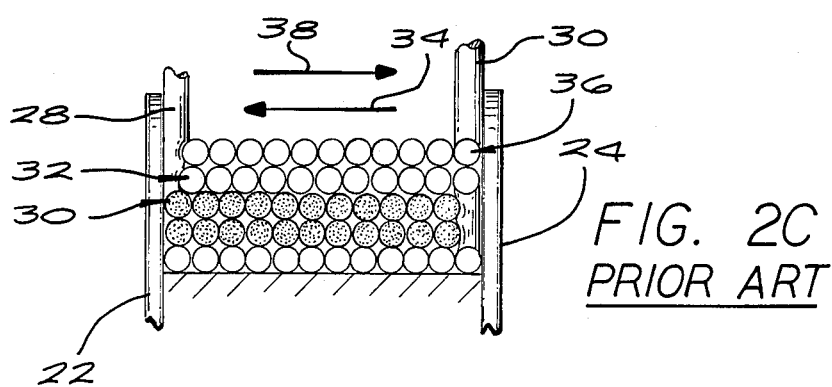
Figure 1:
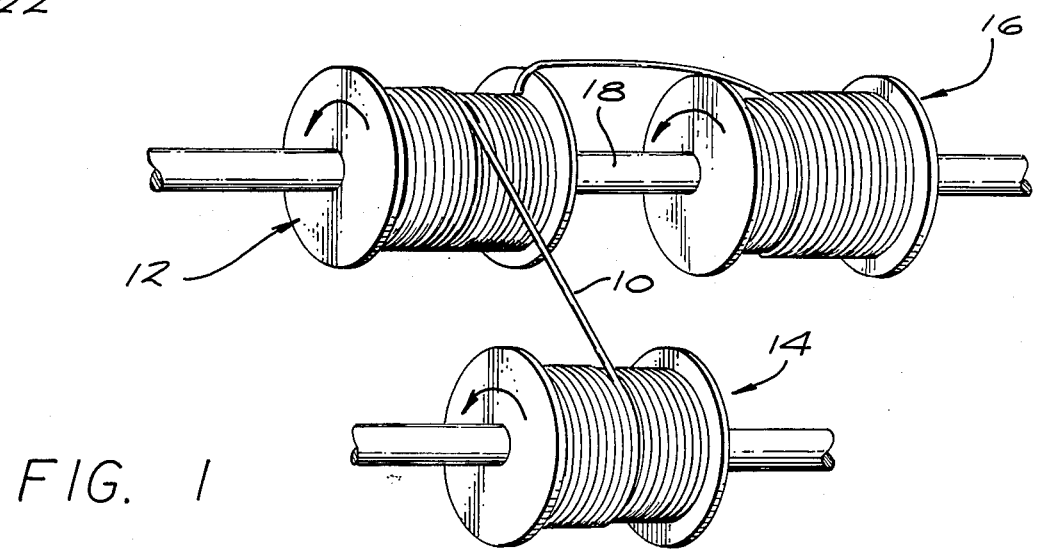
FIG. 1 is a perspective view of an arrangement for forming a quadrupole-wound fiber optic coil in accordance with either the prior or with the method of this invention.

Returning to the drawings, FIGS. 3A and 3B are views of layers of a partially-formed sensor coil (wound from the two supply spools 14 and 16) in accordance with the prior art method disclosed with reference to FIGS. 2A through 2C above.

FIG. 3A discloses a layer 40 of turns wound from the second supply spool 16. This layer is wound directly atop a pair of layers from the first supply spool 14. The second of the quarupole wound pair of layers is still to be wound from the second supply 16 toward the flange 24 as indicated by the portion of the lead 30 that is "absent" from its home flange. As is seen, a pattern of microbends, most prominently within a region 42, is propagated through the layer 40, the turns of the layer closest to the first supply spool lead 28 suffering the most severe (smallest radius) distortions. Similarly, in FIG. 3B, it is seen that a corresponding series of microbends likewise distorts a typical layer 44 wound from the second supply spool 16 as a consequence of the pop-up of the first supply lead 30 at the inner surface of the second flange 18 of the sensor spool 12. Additionally, the outward pressure exerted by the winding layers against the flanges 22 and 24 stresses the pop-up segments of the leads 28 and 30, squeezing the semi-compressible and deformable fiber 10. Further, the winding process itself, wherein the pop-up segments of leads 28 and 30 project at right angles to wound layers introduces severe microbends into the continuous fiber 10.

While a representative diameter of fiber for forming an optical sensor coil is eight-thousandths (0.008) of an inch, it has been found that the effects of microbends introduced into coils formed in accordance with the prior art are significant. As mentioned above, an unacceptably large, order-of-magnitude degradation of extinction ratio has been measured. In addition, it is difficult to maintain proper fiber tension during the winding process as it is quite difficult to exert constant tension upon both the turns and the pop-up segments that join layers of windings rendering the prior art winding process tedious, time-consuming and difficult.

Figure 4A:
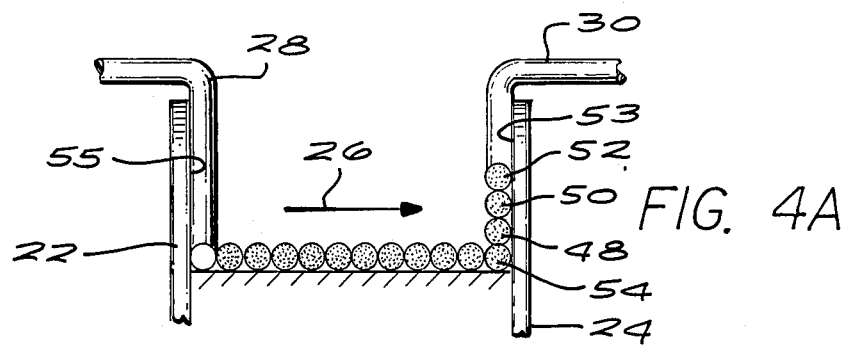
FIGS. 4A through 4C illustrate the formation of a quadrupole-wound fiber optic coil in accordance with the invention.
Figure 4B:
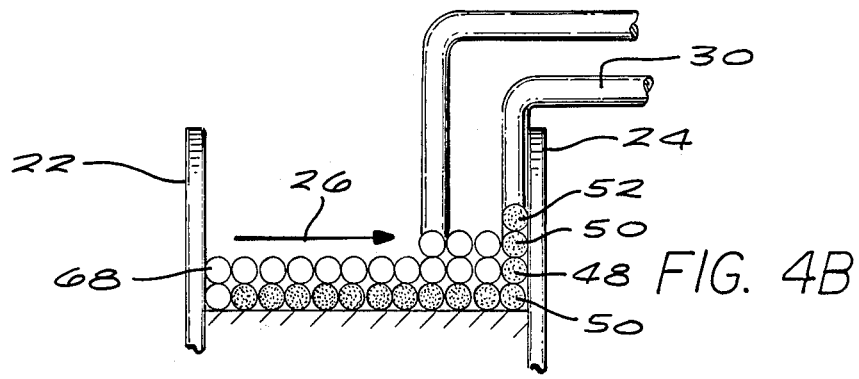
Figure 4C:
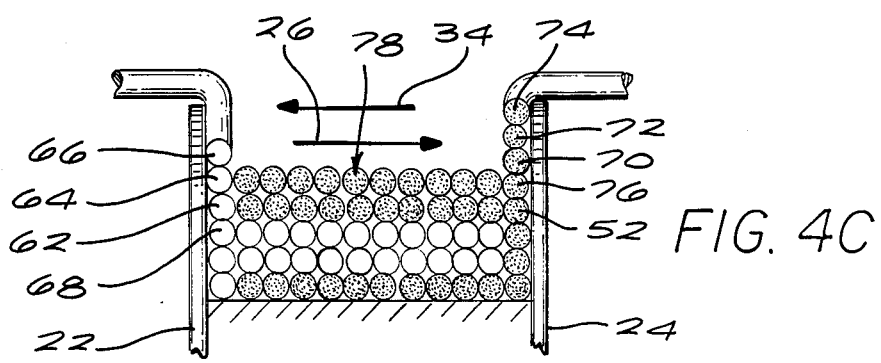

The formation of a quadrupole-wound fiber optic coil in accordance with the present invention is illustrated in FIGS. 4A through 4C. As before, the midpoint of the fiber 10, which is precision-wound upon a pair of supply spools, is positioned upon the central core of the sensor spool 12 adjacent the inner surface of the flange 22. Also, as before, a single inner layer is formed adjacent the central core 20 by winding fiber 10 from a supply spool (in the direction 26) from the flange 22 to the flange 24.

Three turns 48, 50 and 52 are wound concentric with the "end" turn 54 (turn adjacent the flange 24) of the first layer. The turns 48, 50 and 52 are held to the flange 24 by means of an appropriate adhesive coating 53 at the interior of the flange 24. A like adhesive coating layer 55 is located at the interior surface of the flange 22.

Thereafter, as shown, in FIG. 4B a layer is wound from the other supply spool in the same direction 26. However, the end turn 58 of the layer 56 does not exert pressure and stress along the length of the lead 30 of the previously-wound layer. Rather, this end turn abuts against the turn 48 which, with the concentric turns 50 and 52, forms a fiber "barrier" adjacent the flange 24.

The second quadrupole layer of fiber from the second supply spool is then wound in the opposite direction 34 toward the flange 22. As shown in FIG. 4C, three turns 62, 64 and 66 are wound from the lead 28 concentric with the end turn 68 of the just-formed quadrupole-wound layer pair. The stippled layer pair atop that layer is wound from the first supply as before beginning with the topmost turn 52 that was previously wound concentric with the end turn 54 of the initial layer and, upon completion of the winding of a layer pair, concentric turns 70, 72 and 74 are wound concentric with the end turn 76 of the layer. The overall winding pattern of a quadrupole wound coil formed in accordance with this invention is shown schematically in FIG. 5. The paths of travel of the leads 28 and 30 associated with the supplies 12 and 14 are indicated by the respective primed notations.

By winding three concentric turns about the end turn at the end of the winding from a particular supply spool and thereby effectively transforming pop-up segments of the elongated fiber leads into series of overlapping, aligned concentric turns, a number of significant advantages are realized over a coil wound in accordance with the prior art. First, the pattern and propagation of microbends and distortions throughout the layers of the coil, shown and discussed with reference to FIGS. 3A and 3B above, is not created in a coil wound in accordance with the invention. This results from the fact that the leads that connect pairs of layers wound from a particular supply form a composite object of effectively infinite radius of curvature. The "wound lead" of the invention does not project a somewhat compressible, small radius into the edge of a wound layer. In the prior art coil, a pattern of microbends is generated about such a radius and propagated through the entire layer by virtue of the necessarily-tight winding of each layer. In the present invention, the barrier created by the alignment of concentric turns at the end of each layer presents a uniform "wall" of one turn in thickness that presents a substantially "flat" surface that does not project into the layer but rather defines the end thereof. The effective radius of the "object" that the layer abuts is infinite. Therefore, microbends are neither created nor generated within the layers of the resultant coil.

In addition, all portions of the continuous fiber 10 of a coil wound in accordance with the invention are of substantially identical radius of curvature. This is in contrast to the prior art coil wherein inter-layer pair lead (pop-up) segments experience radical (approximately ninety degree) bends at beginning and end of each layer-pair winding sequence. The presence of such discontinuities contributes significantly to the measured degradation of extinction ratio and complicates the analysis of data generated by a sensing coil formed in accordance with the prior art.

Finally, the pinching of leads shown in FIGS. 2B and 2C is avoided. It is well known that such pinching of the fiber 10 introduces undesired and difficult-to-evaluate phase shift and like effects that further degrade instrument performance.

Thus it is seen that the present invention provides an improved quadrupole-wound sensing coil for a fiber optic gyroscope and a method for forming such a coil. By forming a coil in accordance with the invention, one obtains a structure that is not subject to the kinds of signal losses and degradation that are exerienced in coils formed in accordance with the prior art techniques. A coil formed in accordance with the invention is free from layer turn distortions of the prior art that limit packing density and cause miswrap, requiring both time and effort to unwrap and rewrap the coil. Further, by increasing packing density, movement of the fiber is prevented within the coil, providing an instrument of increased ruggedness and stabilizing the coil against aging.

While this invention has been described in its preferred embodiment, its scope is not limited thereto. Rather it is only limited insofar as defined in the following set of claims and such scope includes all equivalents thereof.

What is claimed is:

1. A method for winding an optical fiber in a quadrupole configuration from first and second supplies onto a sensor spool comprising a central core and opposed flanges comprising the steps of:
   (a) locating a point of said fiber intermediate said supplies; then
   (b) positioning said point of said fiber adjacent the inside surface of the first flange of said sensor spool; then
   (c) winding a layer of said fiber from said first supply in a first direction along the width of said core; then
   (d) forming a first supply lead by winding three concentric turns continuous with and about the end turn of said last-named layer adjacent the second flange of said spool; and
   (e) securing said three concentric turns of said first supply lead to the inner surface of said second flange; then
   (f) winding a layer of said fiber from said second supply in said first direction along the width of said central core to said first supply lead; then
   (g) winding a layer of said fiber from said second supply reel in a second, opposite direction, along the width of said central core; then
   (h) forming a second supply lead by winding three concentric turns continuous with and about the end turn of said last-named layer adjacent said first flange of said spool; and (i) securing said three concentric turns of said second supply lead to the inner surface of said first flange; then (j) winding a pair of layers from said first supply continuous with said first supply lead substantially in accordance with steps f through h above so that said second layer of said pair of layers from said first supply terminates with three turns concentric with the last turn of said layer thereby forming a first supply lead adjacent said second flange of said spool; and (k) securing said three turns of said first supply lead to the inner surface of said first flange; then (l) winding pairs of layers alternately from said first and second supplies in accordance with steps f through j whereby said concentric turns form first supply leads and second supply leads of concentric turns adhesively secured to the inner surfaces of the opposed flanges that bridge each overlying layer pair wound from each of said supplies.

2. A method as defined in claim 1 further characterized in that:
  (a) each of said supplies is a spool; and
  (b) said optical fiber is precision wound upon each of said supply spools.

3. A method as defined in claim 1 wherein said intermediate point is the midpoint of said fiber.

4. A quadrupole fiber optic coil wound from a pair of supplies comprising, in combination:
  (a) a plurality of wound layers, each of said layers comprising a plurality of adjacent coaxial turns;
  (b) said plurality of layers including a single, inner layer and a plurality of layers formed in alternating pairs from said two supplies; and
  (c) said inner layer and each of said layer pairs terminates in three concentric turns about the end turn of said layer forming leads to the next layer pair wound from the associated supply.

* * * * *